United States Patent [19]
Lhuisset

[11] Patent Number: 5,992,705
[45] Date of Patent: Nov. 30, 1999

[54] DEVICE FOR THE TRANSLATIONAL DRIVING OF A PISTON FOR THE DISTRIBUTION OF PASTY PRODUCTS

[75] Inventor: François Lhuisset, Montgeron, France

[73] Assignee: LVMH Recherche, Nanterre, France

[21] Appl. No.: 08/983,614

[22] PCT Filed: May 14, 1997

[86] PCT No.: PCT/FR97/00858

§ 371 Date: Apr. 17, 1998

§ 102(e) Date: Apr. 17, 1998

[87] PCT Pub. No.: WO97/43194

PCT Pub. Date: Nov. 20, 1997

[30] Foreign Application Priority Data

May 15, 1996 [FR] France ................................ 96 06098

[51] Int. Cl.⁶ ........................................................ B67D 5/42
[52] U.S. Cl. .......................... 222/386; 222/405; 401/176
[58] Field of Search ................................... 222/386, 390, 222/405; 401/171, 176

[56] References Cited

U.S. PATENT DOCUMENTS 1,701,663  2/1929  Clark ........................................ 222/390
5,863,142  1/1999  Lhuisset et al. ......................... 222/390

FOREIGN PATENT DOCUMENTS 2 697 311  4/1994  France .
830 773  2/1952  Germany .
94 10481  5/1994  WIPO .

OTHER PUBLICATIONS

Derwent WPI Acc No. 94–160923/199420, English language abstract of France 2 697 311 and WO 94/10481.

*Primary Examiner*—Philippe Derakshani
*Attorney, Agent, or Firm*—Pennie & Edmonds LLP

[57] ABSTRACT

The present invention relates to a relative translational driving of a piston-forming part into a body, as well as the application of the device to an applicator apparatus. The device includes blades (5) of which the cutting edge is inclined with respect to the longitudinal axis X–X' of the piston-forming part (4) or of the body (2), the blades being integral with the external wall (4a) of the piston-forming part (4) so as to bite on the internal wall (2a) of the body (2) so that the rotation of the piston-forming part (4) with respect to the body (2), or vice versa, causes the displacement of the part into the body (2). This device applies for example to the fabrication of an applicator used to apply a viscous fluid such as nail varnish, or a solid gel such as a deodorant gel.

15 Claims, 3 Drawing Sheets

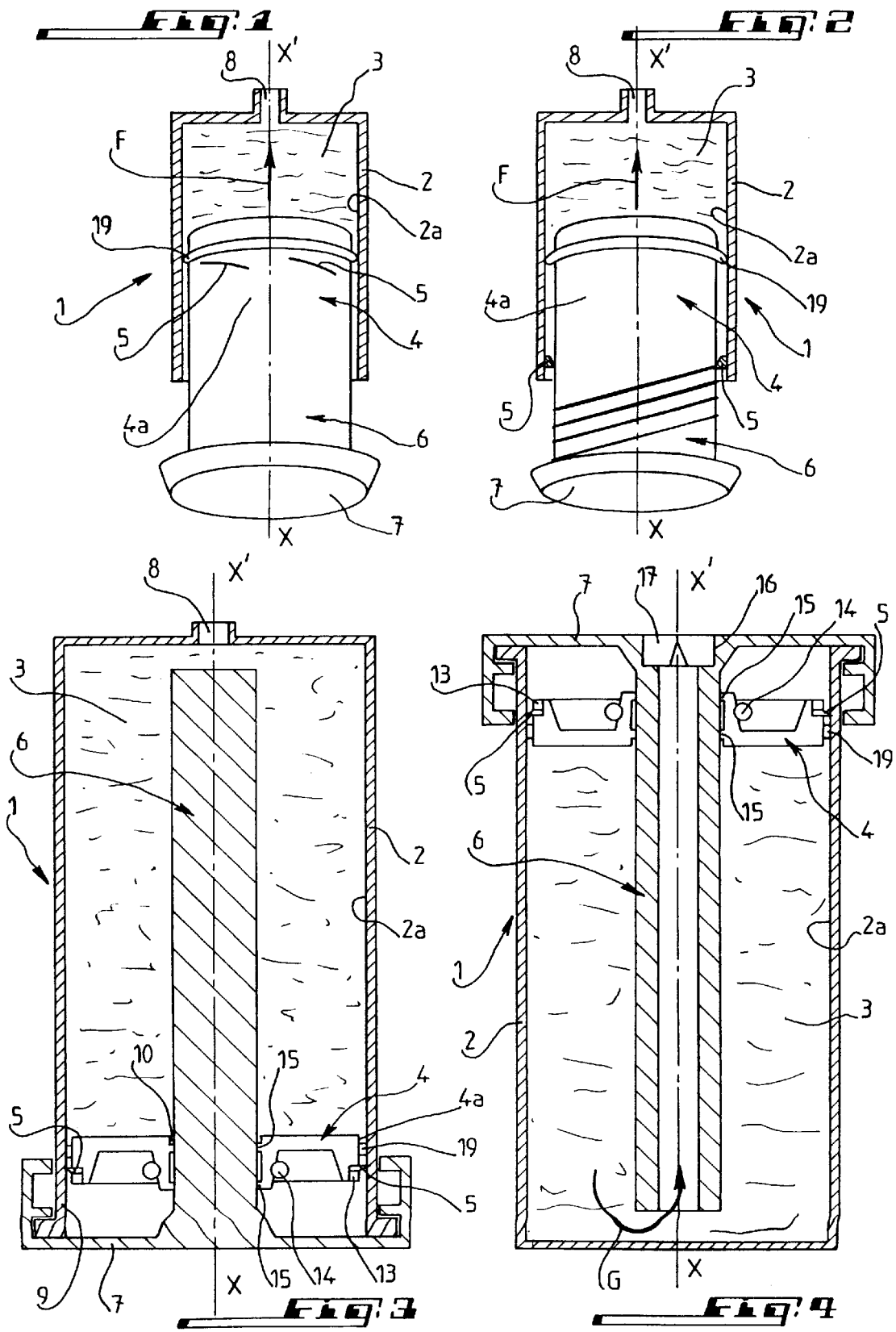

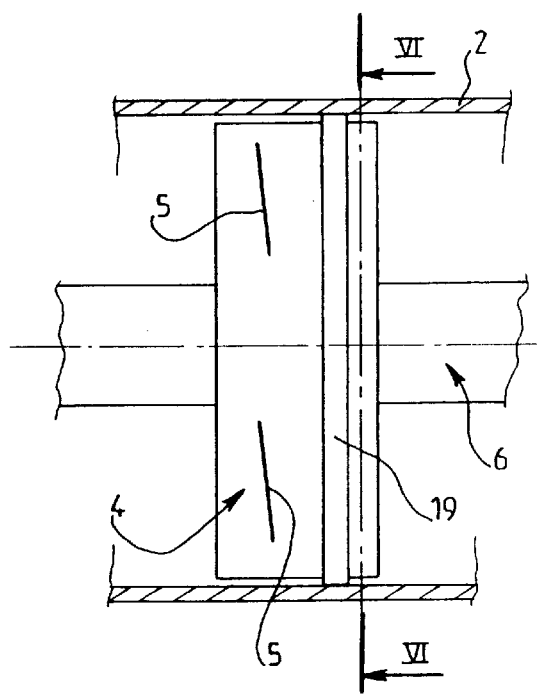
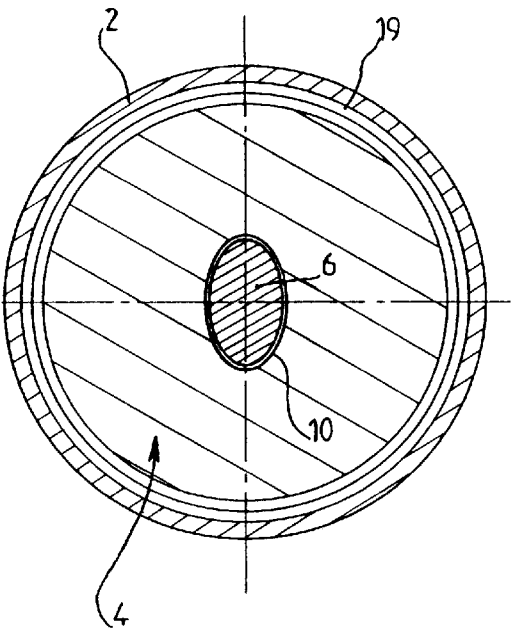
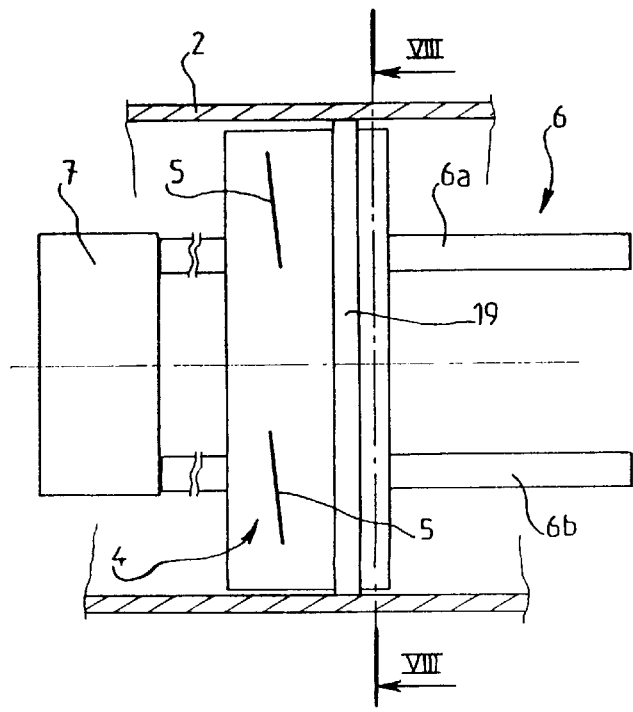
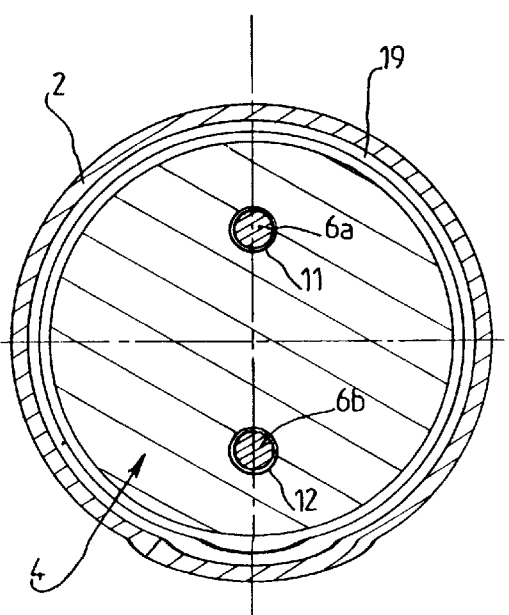

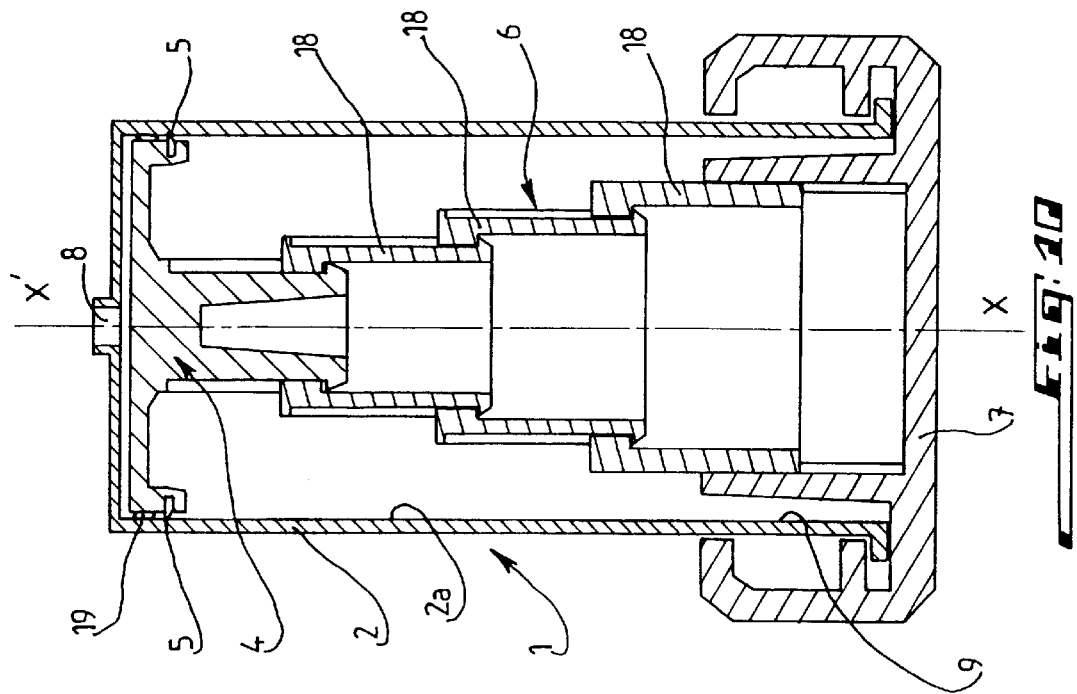
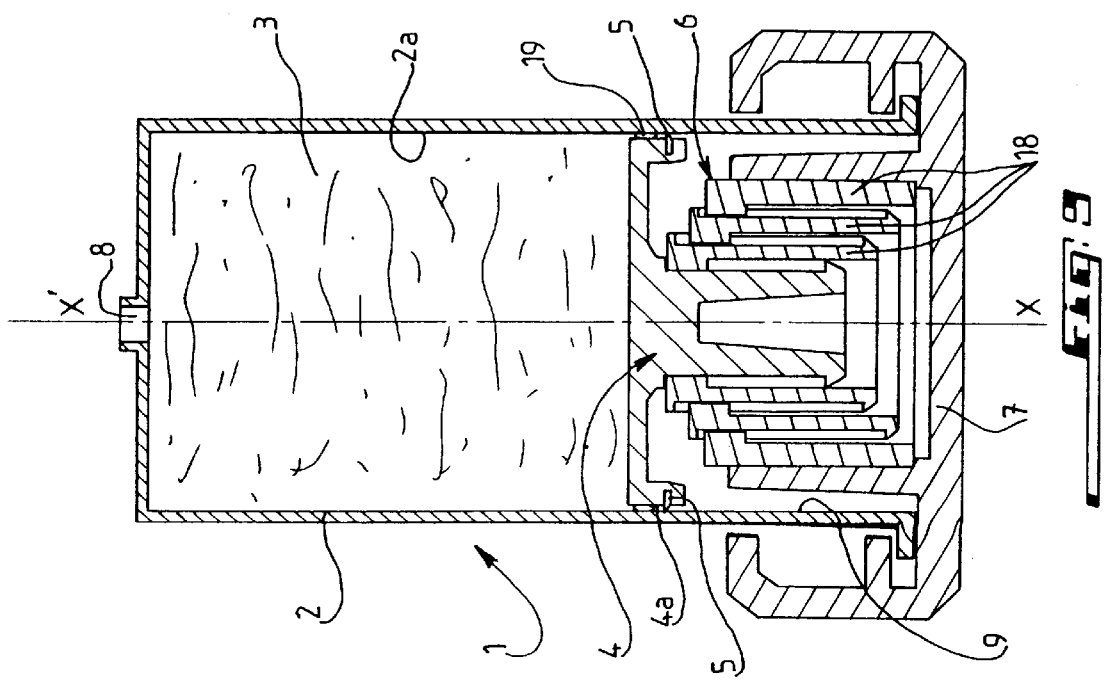

DEVICE FOR THE TRANSLATIONAL DRIVING OF A PISTON FOR THE DISTRIBUTION OF PASTY PRODUCTS

FIELD OF THE INVENTION

The present invention has essentially as its subject an improved device for the relative translational driving of a part forming a piston in a body.

It is also directed to an apparatus applying a more or less viscous fluid such for example as nail varnish or a cosmetic deodorant gel fitted with this device.

BACKGROUND OF THE INVENTION

One has described in the French patent No 9212885 belonging to the applicant and published under No 2,697, 311 a device for the translatory driving of a part forming a piston in a body by the rotation of a rod extending through the said part which is held against rotary motion in the body.

More precisely, the piston-like part was provided with one or several blades the cutting edge of which was inclined with respect to the longitudinal axis of the rod and which projected sidewise through the opening of the piston-like part extended through by the rod for being caused to bite into the external smooth periphery of this rod so as to incise it helically during its rotation and to thus cause the translational motion of the part forming a piston along the rod during this rotation.

Now it has been found that the fitting of the blade or blades into the small hole of the part forming a piston and through which the rod extends was tricky and sometimes even difficult.

Moreover the part forming a piston had to be made fast in rotation to the body by joints and the making fast in rotation of these two elements sometimes was difficult to be obtained more especially as the piston displacing itself axially in the body was necessarily subjected to a torque resulting from the blade or blades biting into the rod extending centrally through the part forming a piston.

SUMMARY OF THE INVENTION

The present invention has in particular as its object to solve these problems by proposing an improved driving device permitting an easy setting in of the blades and removing the problems of the holding against rotation of the part forming a piston during its axial translation in the body.

For that purpose the invention has as its subject a device for the relative translatory driving of a part forming a piston in a body through the medium of at least one blade the cutting edge of which is inclined with respect to the longitudinal axis of the part or body, characterized in that the said blade is either made fast to the external wall of the part forming a piston to be caused to bite into the internal wall of the body or made fast to the internal wall of the body for being caused to bite into the external wall of the part forming a piston in order that the rotation of the part forming a piston with respect to the body or the reverse causes the displacement of the said part within the body.

One already understands that the setting in of the blades onto the external wall of the piston or onto the internal wall of the body in which the said piston is moving in translation will be much easier and that the problem of the holding against rotation of the piston with respect to the body is no longer raised.

According to another characteristic, the device of the invention comprises a rod made fast in rotation to the part forming a piston.

This rod is fastened onto the piston or made in one piece through molding with the latter.

According to another embodiment, the rod consists of at least one element with a non circular cross-section extending in fluid-tight relationship through an aperture with a corresponding cross-section formed in the piston so as to ensure the connection for unitary rotation of the rod and of the piston.

According to another embodiment, the aforesaid rod consists of a plurality of telescopic elements connected to the piston.

One should further specify here that in both embodiments set forth previously, that end of the rod which is opposite to that co-operating with the piston is mounted in freely rotatable relationship onto one end of the body containing the piston.

In the case where the rod exhibits a non circular cross-section extending in fluid-tight relationship through an aperture with a corresponding cross-section formed in the piston, a ring, collar or the like may advantageously be provided on the piston to promote the fluid-tightness at the level of the said aperture extended through by the rod along which the piston is sliding.

According to still another characteristic of the device of the invention in the case where the blades are made fast to the external wall of the piston, the latter comprises a ring or the like for the retaining of the said blades.

The piston forming part of the device according to this invention further comprises a sealing joint between the piston and the inner wall of the body.

The device forming the subject of this invention may advantageously be applied to the making of an apparatus applying a more or less viscous fluid such for example as a cream or nail varnish.

BRIEF DESCRIPTION OF THE DRAWINGS

But further advantages and characteristics of the invention will appear better in the detailed description which follows and refers to the attached drawings given by way of example only and in which:

FIG. 1 is a very diagrammatic view in elevation and in axial section of an applicator apparatus fitted with the device according to this invention;

FIG. 2 is a view similar to FIG. 1 but showing another embodiment of the fitting in of the blades;

FIG. 3 is a diagrammatic elevational view in axial section of another embodiment of the applicator apparatus according to this invention and comprising a rod rotatably mounted onto the end of the body receiving the piston;

FIG. 4 is a view similar to FIG. 3 and illustrating an applicator apparatus with an inverted configuration and using a hollow rod;

FIG. 5 is a partial diagrammatic view of the rod-piston unit used in the applicator apparatus illustrated by FIG. 3 or 4;

FIG. 6 is a view in section along the line VI—VI of FIG. 5;

FIG. 7 is a view similar to FIG. 5 but showing another embodiment of the rod for the rotary driving of the piston within the body;

FIG. 8 is a view in section made along the line VIII—VIII of FIG. 7;

FIG. 9 is a diagrammatic view in axial section of still another embodiment of applicator apparatus according to this invention with a telescopic rod, this apparatus being illustrated in the position filled with the product to be dispensed;

FIG. 10 is a view similar to FIG. 9 but showing the empty apparatus, i.e. the product of which it contained has been entirely dispensed.

DETAILED DESCRIPTION OF THE PREFERRED EMBODIMENT

One sees on FIGS. 1 to 4 and 9, 10 an applicator apparatus 1 which comprises a hollow body 2 forming a tank for any more or less viscous liquid 3 constituted by a nail varnish or a cream for example.

In the body 2 is mounted a part forming a piston 4 likely to move axially within the said body for dispensing a certain amount of product.

One has further shown at 5 on the figures blades the cutting edge of which is inclined with respect to the longitudinal axis X–X' of the piston 4 or of the hollow body 2 and the structure and utility of which are described in the French patent cited at the beginning of this description and which one may refer to.

As it clearly appears on FIG. 1 and according to the invention, the blades 5 are set in on the external wall 4a of the piston 4 and are projecting from this external wall 4a for being caused to bite into the internal wall 2a of the hollow body 2.

In the embodiment illustrated by FIG. 2, the blades 5 are fitted in on the internal wall 2a of the hollow body 2 in order reversely to be caused to bite into the external wall 4a of the piston 4.

In both embodiments hereabove one sees that the piston 4 is made fast in rotation to a rod 6 actuatable by a knob 7. More precisely according to the example shown on FIGS. 1 and 2, the rod 6 is made in one integral piece of material or by being molded with the piston 4, it being well understood that one could provide without departing from the scope of the invention, an independent rod 6 positively fastened onto the piston 4. Thus during the rotation of the rod 6 by its knob-shaped end 7, the blades 5 caused to bite either the internal wall 2a of the body 2 (FIG. 1) or the external wall 4a of the piston 4 (FIG. 2) will cause the relative displacement of the piston 4 in the body 2 as physically shown by the arrow F to dispense a certain amount of product 3 through the aperture 8 formed in the body 2, it being understood that this aperture could be formed in any suitable manner to for example constitute a flexible valve for the delivery and protection of the product 3.

In the embodiment of FIG. 3, the rod 6 made fast to the operating knob 7 which here is mounted in freely rotatable relationship onto one end 9 of the body 2 the opposite end of which comprises the aperture 8, extends through the piston 4 the external wall 4a of which carries the blades 5.

But as in the previous embodiments, the rod 6 is made fast in rotation to the piston 4 and for that purpose as one sees it well on FIGS. 5 and 6 it exhibits a non circular for example oval cross-section, extending in fluid-tight relationship through an aperture 10 with a corresponding cross-section formed in the piston 4. The fluid-tightness between the rod 6 and the aperture 10 is not shown but may be provided by any suitable means such for example as a sealing joint, a skirt or quite simply constitute a friction zone.

In the alternative embodiment visible on FIGS. 7 and 8, the connection for unitary rotation of the rod and of the piston 4 is ensured by the fact that the said rod actually consists of two rods 6a, 6b extending in fluid-tight relationship through two circular holes 11, 12, respectively, extending through the piston 4. The fluid-tightness is also ensured between the rods 6a, 6b and the holes 11, 12 in the piston 4 through which they extend.

The operation of the embodiment of FIG. 3 is the following.

Under the effect of the rotation of the rod 6 with the assistance of the knob 7, thereby rotating the piston 4, the latter with its blades 5 will helically incise the internal wall 2a of the body 2, thereby causing the progression of the piston in the aperture 10 by sliding along the rod 6. On FIG. 3, the piston 4 is shown in the lower position, i.e. the piston forming a tank 2 is filled with product 3 ready to be dispensed.

One has shown at 13 on FIG. 3 a ring or the like ensuring the retaining and the blocking of the blades 5 onto the piston 4 so that the mounting of the said blades onto the piston is extremely easy.

One has further shown at 14 on FIG. 3 a ring or collar which is not compulsory but which is likely to promote the fluid-tightness of the hole or passage-way 10 formed in the piston 4 and extended through by the rod 6. In this respect one may see on FIG. 3 that the passage-way 10 here comprises portions in the shape of annular joints 15 co-operating with the periphery of the rod 6.

The embodiment visible on FIG. 4 is quite similar to that of FIG. 3 except that here it relates to an apparatus configuration which in a way is inverted owing to the fact that the rod 6 is not solid as shown on FIG. 3 but hollow. Moreover the hollow body forming a tank 2 does strictly speaking not comprise any outlet aperture 3 for the product, this aperture being constituted by the end 16 of the rod 6 connected to the knob 7 and which comprises according to an exemplary embodiment, a flexible valve 17 for the delivery and protection of the product 3.

Therefore the rotation of the hollow rod 6 hence of the piston 4 which will advance along this rod will cause the penetration of the product 3 into the rod 6 in the direction of the arrow G for exiting through the flexible valve 17.

In the embodiment of FIGS. 9 and 10 which is akin to that visible on FIG. 3, one sees that the rod 6 consists of a plurality of telescopic elements 18 which are connected as to both end elements on the one hand to the piston 4 and on the other hand to the operating knob 7 freely rotatably mounted onto the end 9 of the body forming a tank 2. The telescopic elements 18 may axially move with respect to each other but may not turn with respect to one another in view of their polygonal section or because they are constituted by cylindrical elements provided with co-operating grooves and/or ribs not shown. The operation of this embodiment is effected as previously explained, i.e. when starting from the position visible on FIG. 9 under the effect of the rotation of the knob 7 and therefore of the telescopic elements 18 and of the piston 4, the latter incising with its inclined blades 5 the internal wall 2a of the body 2, will advance towards the aperture 8 by the extension of the telescopic elements 18 as this is well visible on FIG. 10.

One has shown at 19 on the figures a joint ensuring the fluid-tightness with respect to the product 3 contained in the body between the external wall 4a of the piston 4 and the internal wall 2a of the body 2. One will here notice that advantageously one single joint is necessary since according to the invention it is simply a matter of here ensuring a function of fluid-tightness and not a holding against rotation of the piston 4 with respect to the body 2 forming a tank as this was the case in the aforesaid prior patent.

One has thus provided according to the invention an applicator apparatus which solves the problem of setting in of the blades 5 with an inclined cutting edge and which also solves the problem relating to the holding of the piston 4 made fast to for unitary rotation with the body 2.

The invention is of course not at all limited to the embodiments described and illustrated which have been given by way of example only.

Thus the material constituting the different elements of the applicator apparatus could be any suitable synthetic material whatsoever.

This means that the invention comprises all the technical equivalents of the means described as well as their combinations if the latter fall within the scope of the claims which follow.

What is claimed is:

1. A device for translationally driving a piston in a body, the piston having an external wall and the body having an internal wall, comprising at least one blade juxtaposed between the piston and the body, the blade having a cutting edge that is inclined with respect to a longitudinal axis and is operatively associated with one of the external wall of the piston or the internal wall of the body to cause relative displacement between the piston and the body.

2. The device according to claim 1, wherein the blade is attached to the external wall of the piston such that rotation of the piston causes the blade to bite into the internal wall of the body, thereby displacing the piston with respect to the body.

3. The device according to claim 1, wherein the blade is attached to the internal wall of the body such that rotation of the piston causes the blade to bite into the external wall of the piston, thereby displacing the piston with respect to the body.

4. The device according to claim 1, wherein the cutting edge of the blade is inclined with respect to a longitudinal axis of the piston.

5. The device according to claim 1, wherein the cutting edge of the blade is inclined with respect to a longitudinal axis of the body.

6. The device according to claim 1 wherein a rod is rotationally attached to the piston.

7. The device according to claim 6, wherein the rod is attached by fastening the rod to the piston with.

8. The device according to claim 6, wherein the rod is attached by molding the rod as an integral piece with the piston.

9. The device according to claim 6, wherein the rod includes at least one element having a non-circular cross-section and is operatively associated with an aperture formed in the piston and having a corresponding non-circular cross-section, with the rod extending in a fluid-tight manner through the aperture.

10. The device according to claim 6, wherein the rod consists of a plurality of telescopic elements connected to the piston.

11. The device according to claim 9, wherein the rod has an end which is opposite to that co-operating with the piston and is freely rotatably mounted onto an end of the body containing the piston.

12. The device according to claim 9, wherein the piston has associated sealing means for promoting fluid-tightness at the aperture.

13. The device according to claim 2, wherein the external wall of the piston comprises a ring for retaining the blade onto the piston.

14. The device according to claim 1, wherein the piston and the inside wall of the body are operatively associated to create a sealing joint.

15. An apparatus for applying a solid gel comprising a device according to claim 1.

* * * * *